(12) United States Patent
Ferry et al.

(10) Patent No.: US 11,286,536 B2
(45) Date of Patent: Mar. 29, 2022

(54) SYSTEM AND METHOD FOR MANUFACTURING A PART

(71) Applicant: GENERAL ELECTRIC COMPANY, Schenectady, NY (US)

(72) Inventors: Allan Ferry, Windsor, CT (US); Ronald Konopacki, Suffield, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 170 days.

(21) Appl. No.: 16/533,017

(22) Filed: Aug. 6, 2019

(65) Prior Publication Data
US 2021/0040575 A1   Feb. 11, 2021

(51) Int. Cl.
| | | |
|---|---|---|
| *C21D 9/08* | (2006.01) | |
| *B23K 37/04* | (2006.01) | |
| *C21D 1/42* | (2006.01) | |
| *C21D 9/00* | (2006.01) | |

(52) U.S. Cl.
CPC .............. *C21D 9/08* (2013.01); *B23K 37/04* (2013.01); *C21D 1/42* (2013.01); *C21D 9/0006* (2013.01)

(58) Field of Classification Search
CPC .......... C21D 9/08; C21D 1/42; C21D 9/0006; B23K 37/04
See application file for complete search history.

(56) References Cited

U.S. PATENT DOCUMENTS

| | | | |
|---|---|---|---|
| 4,223,201 A | 9/1980 | Peters et al. | |
| 4,798,321 A | 1/1989 | Moran | |
| 8,456,123 B2 | 6/2013 | Nishiuchi et al. | |
| 8,651,918 B1 | 2/2014 | Quinn | |
| 9,457,962 B1 | 10/2016 | Quinn | |
| 10,920,434 B1* | 2/2021 | Pearson, Jr. | ............ E04G 21/16 |
| 2005/0167468 A1 | 8/2005 | Kislovsky et al. | |
| 2009/0249606 A1* | 10/2009 | Diez | .................. B23K 37/0461 29/428 |
| 2017/0129039 A1* | 5/2017 | Williams | ............. B23K 10/006 |
| 2018/0101943 A1 | 4/2018 | Konopacki et al. | |

FOREIGN PATENT DOCUMENTS

| | | |
|---|---|---|
| CN | 109623104 A | 4/2019 |
| WO | 2017/207302 A1 | 12/2017 |

OTHER PUBLICATIONS

International Search Report from corresponding International Application No. PCT/US2020/042232 dated Oct. 5, 2020.

* cited by examiner

*Primary Examiner* — Scott R Kastler
(74) *Attorney, Agent, or Firm* — Grogan, Tuccillo & Vanderleeden, LLP (57) ABSTRACT

A system for manufacturing a part is provided. The system includes a gantry, a first mobile arm and a second mobile arm, at least one conveyor and at least one sensor. The gantry has a first member and a second member disposed opposite the first member so as to define an opening. The first and the second mobile arms are disposed on the first and the second members, respectively. The at least one conveyor is operative to move the part through the opening so as to position the part within access of the first and the second mobile arms. The at least one sensor is operative to guide the first and the second mobile arms to one or more areas of the part. The first and the second mobile arms are operative to perform a manufacturing process on the part at the one or more areas.

18 Claims, 7 Drawing Sheets

SYSTEM AND METHOD FOR MANUFACTURING A PART

BACKGROUND

Technical Field

Embodiments of the invention relate generally to manufacturing of boilers, and more specifically to a system and method for manufacturing a part.

Discussion of Art

Many electrical power generation plants utilize steam generators to power turbines, which generate electrical power. Such plants typically use boilers to generate steam via assemblies of tubes, referred to herein as "pressure part assemblies" or "tube assemblies", that capture thermal energy emitted by combustion of a fuel in a combustion chamber. Such pressure part assemblies are often located in or near the combustion chamber, e.g., "waterwalls", or in various regions of an accompanying heat steam recovery generator ("HRSG") such as the superheater, reheater and/or economizer sections. Pressure part assemblies are typically formed by metal tubes, herein also referred to as "assembly tubes" and/or simply "tubes", welded together. During steam generation operations, the tubes of the pressure part assemblies are filled with water, thus enabling the pressure part assemblies to function as heat exchangers by capturing/absorbing heat emitted by combusting the fuel and/or other hot gases/vapors and transferring the captured heat to the water.

Manufacturing of tube assemblies has traditionally been a difficult and time-consuming process requiring manual welding of the tubes. Additionally, the welds between tubes must often undergo post-welding heat treatment or solution annealing. Such procedures often involve queuing tube assemblies in batches for manual heat treatment or processing in standalone heat treatment facilities, e.g., "car bottom" or "bogie hearth" furnaces that are not integrated into the assembly line that primarily manufactures the tube assemblies.

Such standalone heat treatment facilities usually have floors that serve as insulated moveable cars for transporting a batch of tube assemblies in and out of a furnace. As will be understood, however, queuing up tube assemblies into batches and loading and unloading them from the furnace is a time-consuming process that risks damaging the welds, and/or other parts of a tube assembly, due to handling of the tube assemblies prior to being heat treated.

While some standalone facilities utilize continuous rolling hearth furnaces, i.e., a conveyor that continuously moves tube assemblies through an open furnace, such systems are usually expensive to install, operate and maintain. Further, such systems can be highly inefficient as they typically heat all portions of a tube assembly whether requiring heat treatment or not.

What is needed, therefore, is an improved system and method for manufacturing a part.

BRIEF DESCRIPTION

In an embodiment, a system for manufacturing a part is provided. The system includes a gantry, a first mobile arm and a second mobile arm, at least one conveyor and at least one sensor. The gantry has a first member and a second member disposed opposite the first member so as to define an opening. The first and the second mobile arms are disposed on the first and the second members, respectively. The at least one conveyor is operative to move the part through the opening so as to position the part within access of the first and the second mobile arms. The at least one sensor is operative to guide the first and the second mobile arms to one or more areas of the part. The first and the second mobile arms are operative to perform a manufacturing process on the part at the one or more areas.

In another embodiment, a method for manufacturing a part is provided. The method includes receiving the part at one or more conveyors operative to move the part through an opening of a gantry, the opening defined by a first member of the gantry and a second member of the gantry disposed opposite the first member. The method further includes positioning the part, via the one or more conveyors, within access of a first mobile arm of the gantry and a second mobile arm of the gantry. The first and the second mobile arms are disposed on the first and the second members, respectively. The method further includes guiding, via at least one sensor, the first and the second mobile arms to one or more areas of the part. The method further includes performing, via the first and the second mobile arms, a manufacturing process on the part at the one or more areas.

In yet another embodiment, a non-transitory computer readable medium including instructions is provided. The instructions adapt at least one processor to receive the part at one or more conveyors operative to move the part through an opening of a gantry, the opening defined by a first member of the gantry and a second member of the gantry disposed opposite the first member. The instructions further adapt the at least one processor to position the part, via the one or more conveyors, within access of a first mobile arm of the gantry and a second mobile arm of the gantry, the first and the second mobile arms disposed on the first and the second members, respectively. The instructions further adapt the at least one processor to guide, via at least one sensor, the first and the second mobile arms to one or more areas of the part. The instructions further adapt the at least one processor to perform, via the first and the second mobile arms, a manufacturing process on the part at the one or more areas.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As also used herein, the terms "upstream" and "downstream," describe the position and/or order of elements on, and/or stages of, an assembly line/conveyor system with respect to a direction that defines the order an object traveling through the assembly line/conveyor system encounters the elements and/or stages. As also used herein, the term "heating contact" means that the referenced objects are in proximity of one another such that heat/thermal energy can transfer between them. Additionally, the term "real time" means a level of processing responsiveness that a user senses as sufficiently immediate or that enables the processor to keep up with an external process.

Additionally, while the embodiments disclosed herein are primarily described with respect to manufacturing parts/components for a boiler or HRSG, e.g., pressure part assemblies, it is to be understood that embodiments of the invention may be applicable to the manufacture of part/components for other types of devices/machines, e.g., solar panels.

Figure 1:
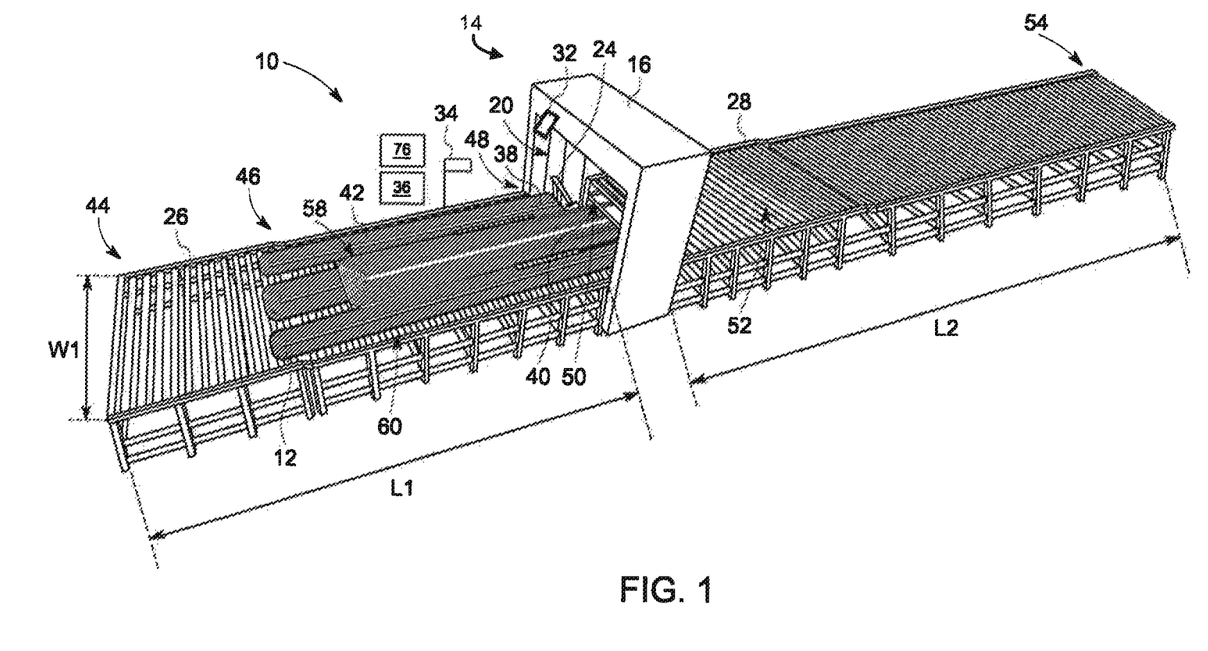
FIG. 1 is a schematic diagram of a system for manufacturing a part, in accordance with an embodiment of the present invention.
Figure 2:
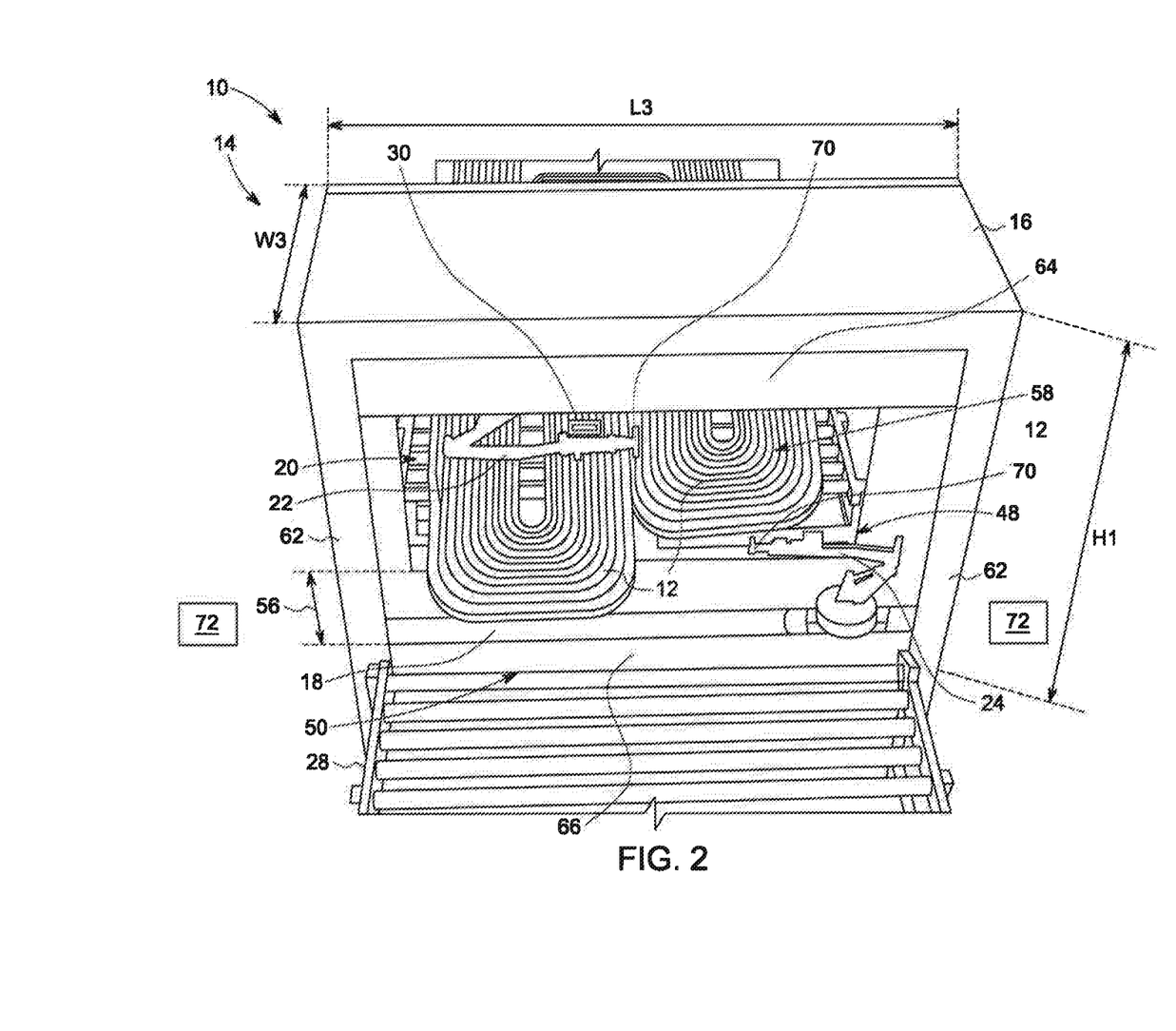
FIG. 2 is another schematic diagram of the system of FIG. 1, in accordance with an embodiment of the present invention.

Referring now to FIGS. 1 and 2, a system 10 for manufacturing a part 12 is shown in accordance with an embodiment of the present invention. The system 10 includes a gantry 14 having a first member 16 and a second member 18 (best seen in FIG. 2) disposed opposite the first member 16 so as to define an opening 20. The system 10 further includes a first mobile arm 22 (best seen in FIG. 2) and a second mobile arm 24 disposed on the first 16 and on the second 18 members, respectively. The system 10 further includes at least one conveyor 26 and 28 operative to move the part 12 through the opening 20 so as to position the part 12 within access of the first 22 and the second 24 mobile arms. As used herein, the term "within access" means being within a distance of an object sufficient to be operated on by the object. Similar, the terms "having access" or "can access", as used herein, mean to be able to operative on an object. In other words, the part 12 being within access of the mobile arms 22 and 24, or the mobile arms 22 and 24 having access to the part 12, means that the mobile arms 22 and 24 are within a distance of the part 12 sufficient to perform an operation on the part 12. The system 10 further includes at least one sensor 30 (FIGS. 2), 32, 34 and 36 operative to guide the first 22 and the second 24 mobile arms to one or more areas 38, 40 and 42 of the part 12. As will be appreciated and explained in greater detail below, the first 22 and the second 24 mobile arms are operative to perform a manufacturing process on the part 12.

As shown in FIG. 1, in embodiments, the at least one conveyor may include a first/upstream conveyor 26 and a second/downstream conveyor 28 disposed on opposite sides of the gantry 14. In such embodiments, the upstream conveyor 26 has a reception end 44, a mid-section 46 and a transfer end 48. The reception end 44 is operative to receive the part 12 which may be moved along the midsection 46 via rollers, and/or other suitable devices, towards the transfer end 48. Similarly, the downstream conveyor 28 may also include a transfer end 50, mid-section 52 and delivery end 54. As best seen in FIG. 2, the transfer ends 48 and 50 may be disposed near and/or within the opening 20 such that the part 12 may be moved/transferred from the upstream conveyor 26 to the downstream conveyor 28 by passing through the opening 20.

In embodiments, conveyors 26 and 28 may move the part 12 by contact rollers, belts, magnets and/or other suitable actuators. In embodiments, the conveyors 26 and 28 may have a width W1 (FIG. 1) of about 15' to about 40' and lengths L1 and L2 (FIG. 1) of about 60' to about 120'. In embodiments, the conveyors 26 and 28 may operative in unison, i.e., at the same speed and in the same direction, or they may operate independently of each other. In embodiments, the conveyors 26 and 28 may be mounted/fixed to the gantry 14.

As best seen in FIG. 2, in embodiments, the transfer ends 48 and 50 are spaced apart from each other so as to form a gap 56 which allows the second mobile arm 24 access to the part 12. In embodiments, the gap 56 may have a length of about 4' to about 10'. Thus, as will be appreciated, in embodiments the mobile arms 22 and 24 collectively have access to all sides of the part 12, i.e., 360° access.

Accordingly, in embodiments, the upstream conveyor 26 may receive the part 12 at the reception end 44 and position the part 12 near and/or within the opening 20 such that the first mobile arm 22 has access to a first/top side 58 of the part 12 and the second mobile arm 24 has access to a bottom side 60 (best seen in FIGS. 5 and 6) of the part, wherein, as used herein, the bottom side 60 is the side of the part 12 that is in contact and/or closest to the conveyors 26 and 28 and/or the second member 18, and the topside 58 is the side of the part 12 opposite the bottom side 60 and/or closest to the first member 16. Once the part 12 is in a suitable position where the mobile arms 22 and 24 can access the one or more areas 38 and 40, the upstream conveyor 26 may stop movement of the part 12 to allow the mobile arms 22 and 24 to perform the manufacturing process.

As will be appreciated, in embodiments, the upstream conveyor 26 may reposition the part 12 as needed such that the mobile arms 22 and 24 can access additional areas, e.g., area 42 (FIG. 1) that may be upstream of areas, e.g., 38 and 40, first accessed by the mobile arms 22 and 24. As will be appreciated, in embodiments, the upstream 26 and the downstream 28 conveyors may work together to position the part 12 with respect to the opening 20. Further, it will also be understood that while the embodiment depicted in the accompanying figures includes two conveyors 26 and 28, other embodiments may use a single conveyor and/or more than two conveyors.

Figure 3:
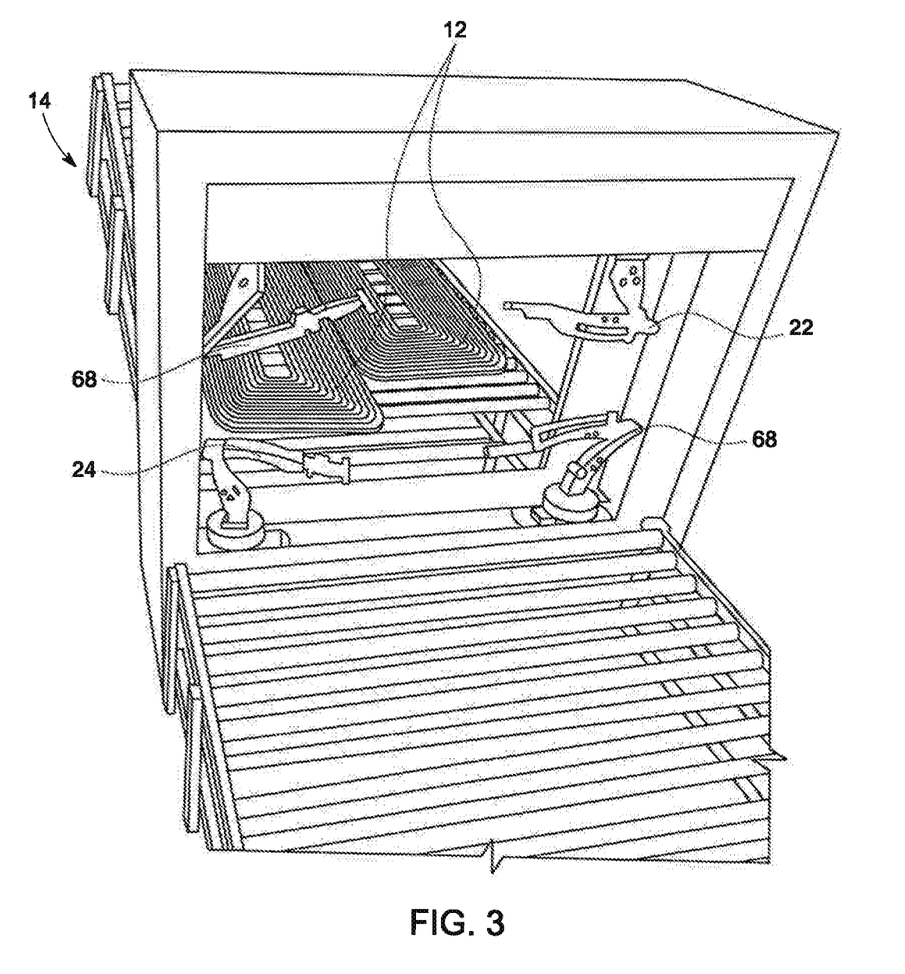
FIG. 3 is yet another schematic diagram of the system of FIG. 1, in accordance with an embodiment of the present invention.

As shown in FIG. 2, the first 16 and second 18 members of the gantry 14 may be supported and/or fixed in place, with respect to each other, via additional members 62. In embodiments, the members 16, 18 and/or 62 may be straight, curved, or other suitable shape, and made from steel, composites, wood, plastics, or other appropriate materials. While FIG. 2 depicts an embodiment of the system 10 having two mobile arms 22 and 24, other embodiments may include additional mobile arms 68, e.g., three or more, as shown in FIG. 3. In embodiments, the gantry 14 may have a height H1, defined as the distance between the first 16 and second 18 members, of about 6' to about 15', a width W3 of about 5' to about 15', and a length L3 of about 15' to about 40'. Thus, in embodiments, the opening 20 may have a substantially rectangular shape as shown in the accompanying figures. It will be understood, however, that, in embodiments, the opening 20 may have another shape, e.g., circular, elliptical, etc. Further, in embodiments, the width W3 of the gantry 14 may be the same as the length of the gap 56. In other embodiments, however, the with W3 of the gantry 14 may be greater than or less than the length of the gap 56. The gantry 14 may further include one or more tracks 64 and 66 (and/or lead screws, sliding assemblies, etc.) disposed in or on the first 16 and second 18 members to facilitate movement of the mobile arms 22 and 24 along the length L3 of the gantry 14.

As stated above, the mobile arms 22 and 24 are operative to perform the manufacturing process on the areas 38, 40 and 42 of the part 12, which may be bend(s) or weld sites within a tube assembly. As such, in embodiments, the mobile arms 22 and 24 may include one or more tools 70 for accomplishing the manufacturing process. The one or more tools 70 may be selectively fixed to the mobile arms 22 and 24 via magnets, fasteners, clamps or other suitable devices. In embodiments, the manufacturing process may be: welding; heat treatment, to include post-weld heat treatment; tempering; solution annealing; inspection; cutting; drilling; cooling; polishing; grinding; and/or other processes for manufacturing the part 12. Accordingly, in embodiments, the one or more tools 70 may include: an inductive heater; a saw; a welding torch; an optical pyrometer; grinding and/or polishing heads; lasers; ultrasonic and/or contact measurement system components; dye penetrant sources; computer vision equipment, e.g., radar, laser sensors, optical cameras, e.g., visual wavelength, infrared and/or ultraviolet cameras; ultrasonic thickness and/or phases array inspection system components; spray coating devices, marking devices; force cooling; drills; and/or other types of devices suitable for performing the manufacturing process. In embodiments, the mobile arms 22 and/or 24 may automatically swap one of the one or more tools 70 for a different tool 70 stored in a container 72. As used herein with respect to the mobile arms 22 and 24 and the tools 70, the term "automatically swap" means to remove a first tool from the mobile arm and attach a second tool to the mobile arm without human intervention.

Figure 4:
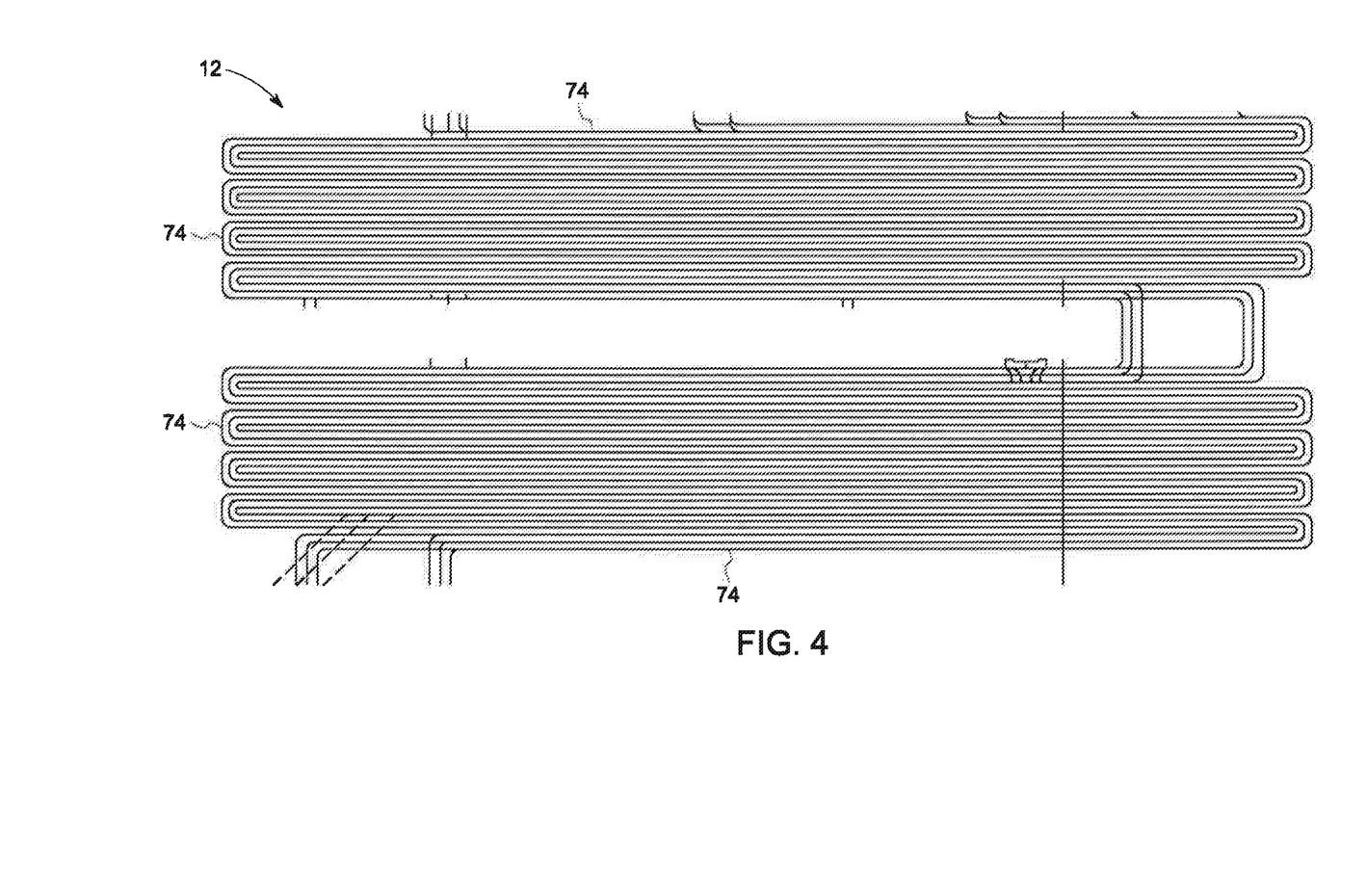
FIG. 4 is a schematic diagram of a part manufactured by the system of FIG. 1, in accordance with an embodiment of the present invention.
Figure 5:
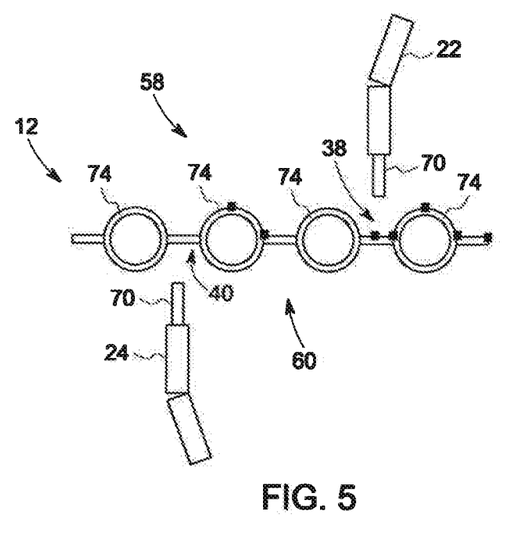
FIG. 5 is a cross-sectional view of the part of FIG. 4, in accordance with an embodiment of the present invention.
Figure 6:
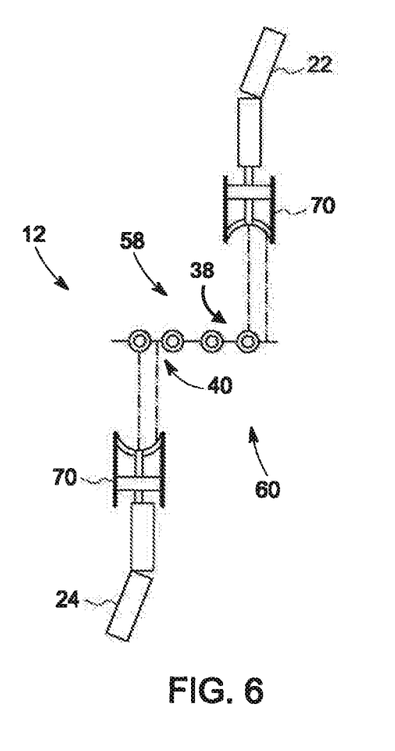
FIG. 6 is another cross-sectional view of the part of FIG. 4, in accordance with an embodiment of the present invention.

For example, turning briefly to FIG. 4, in embodiments, the part 12 may be a pressure part assembly for a boiler or an HRSG made of assembly tubes 74. While FIG. 4 depicts the part 12 as a pressure part assembly having solid bar interconnecting tubes, it will be understood that, in embodiments, the part 12 may be a single tube or any other type of manufactured part. Moving now to FIGS. 5 and 6, in such an embodiment, the mobile arms 22 and 24 may initially have welding torches attached as the tools 70, as shown in FIG. 5, for welding the assembly tubes 74 together at areas 38 and 40. The mobile arms 22 and 24 may then swap the torches out for inductive heaters, as shown in FIG. 6, for post-weld heat treatment of the areas 38 and 40 after having been welded. As will be appreciated, in embodiments, the inductive heater(s) 70 (FIG. 6) may be shaped inductive heaters that conform to the profile of the assembly tubes 74. As used herein, the term "shaped inducive heater" refers to an inductive heater whose heating/magnetic element is curved and/or angled, i.e., not substantially linear/straight.

After post-weld heat treatment of the areas 38 and 40, the mobile arms 22 and 24 may swap the inductive heaters 70 (FIG. 6) for optical pyrometers for performing an inspection of the areas 22 and 24.

Referring back to FIGS. 1 and 2, the at least one sensor 30 (FIGS. 2), 32, 34, and 36 may be: optical cameras to include infrared, ultraviolet and visual wavelength cameras; lasers; radar sensors; pressure sensors; and/or other types of sensors capable of determining the size and/or position of the part 12 in relation to the opening 20 and/or mobile arms 22 and 24, and/or capable of identifying the areas 38, 40 and 42. The sensors may be mounted to the mobile arms 22 and 24, e.g., sensor 30 (FIG. 2), mounted to the gantry 14 e.g., sensor 32 (FIG, 1), mounted to the conveyors 26 and/or 28, e.g., sensor 34 (FIG. 1), and/or apart from the gantry 14, conveyors 26 and 28, and mobile arms 22 and 24, e.g., sensor 36 (FIG. 1).

In embodiments, the sensors 30, 32, 34, and 36 may electronically communicate with a controller 76 (FIG. 1) that compares the data received from the sensors 30, 32, 34, and 36 to known information about the part, e.g., a CAD drawing in order to identify the areas 38, 40 and 42 to be operated on by the mobile arms 22 and 24. Thus, as will be appreciated, in embodiments, the conveyors 26 and 28 provide for general positioning of the part 12 with respect to the mobile arms 22 and 24 and the sensors 30, 32, 34, and 36 provide for localized positioning of the mobile arms 22 and 24 with respect to the areas 38, 40 and 42. In other words, in embodiments, the conveyors 26 and/or 28 position the part 12 such that the areas 38 and 40 are within reach/access of the mobile arms 22 and 24 while the sensors 30, 32, 34, and 36 guide the mobile arms 22 and 24 to the areas 38 and 40.

Figure 7:
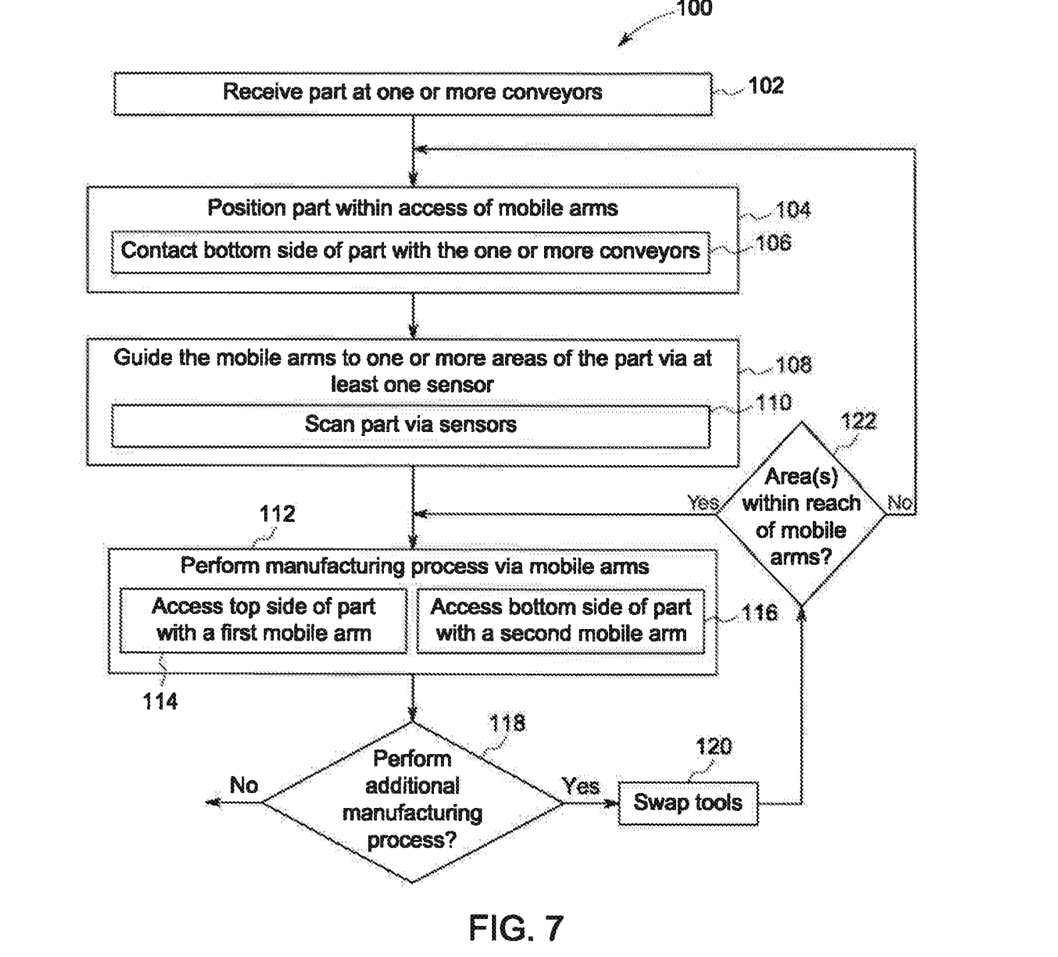
FIG. 7 is a flow chart depicting a method of manufacturing a part utilizing the system of FIG. 1, in accordance with an embodiment of the present invention.

Turning now to FIG. 7, a method 100 for manufacturing a part 12 (FIG. 1) utilizing the system 10 (FIGS. 1 and 2), in accordance with an embodiment of the present invention, is shown. Accordingly, the method 100 includes receiving 102 the part 12 at the one or more conveyors 26 and 28. As discussed above, the part 12 may be received at the reception end 44 (FIG. 1) of the upstream conveyor 26. For example, the part 12 may be placed on the upstream conveyor 26 by a human, crane or other suitable method, and/or fed to the reception end 44 via another conveyor associated with an upstream process for manufacturing of the part 12.

The method 100 further includes positioning 104 the part 12, via the one or more conveyors 26 and 28, such that the part 12 is within access of the mobile arms 22 and 24. In other words, in embodiments, the upstream conveyor 26 moves the part along the mid-section 46 (FIG. 1) towards the opening 20 (FIG. 1). Positioning 104 of the part 12 may include contacting 106 the bottom of the part 12 with the conveyors 26 and 28.

The method 100 further includes guiding 108, via the one or more sensors 30, 32, 34, 36, the mobile arms 22 and 24 to the one or more areas 38, 40 and 42. In embodiments, guiding 108 the mobile arms 22 and 24 to the areas 38, 40 and 42 may further include scanning 110 the part 12 via the sensors 30, 32, 34 and 36.

The method 100 further includes performing 112 the manufacturing process on the part 12 at the one or more areas 38, 40 and 42. In embodiments, performing 112 the manufacturing process may further include accessing 114 the top side 58 (FIGS. 5 and 6) of the part 12 with the first mobile arm 22 and/or accessing 116 the bottom side 60 (FIGS. 5 and 6) of the part 12 with the second mobile arm 24.

As further shown in FIG. 7, in embodiments, the method 100 may include determining 118 where an additional manufacturing process is to be performed on the part 12 via the mobile arms 22 and 24, and if so, the method 100 may also include swapping 120 the one or more tools 70 for other tools, determining if the next area of the part 12 to be worked on is within access of the arms 22 and/or 24, and if not, repositioning the part 12 so that the area is within access of the arms 22 and/or 24.

Figure 8:
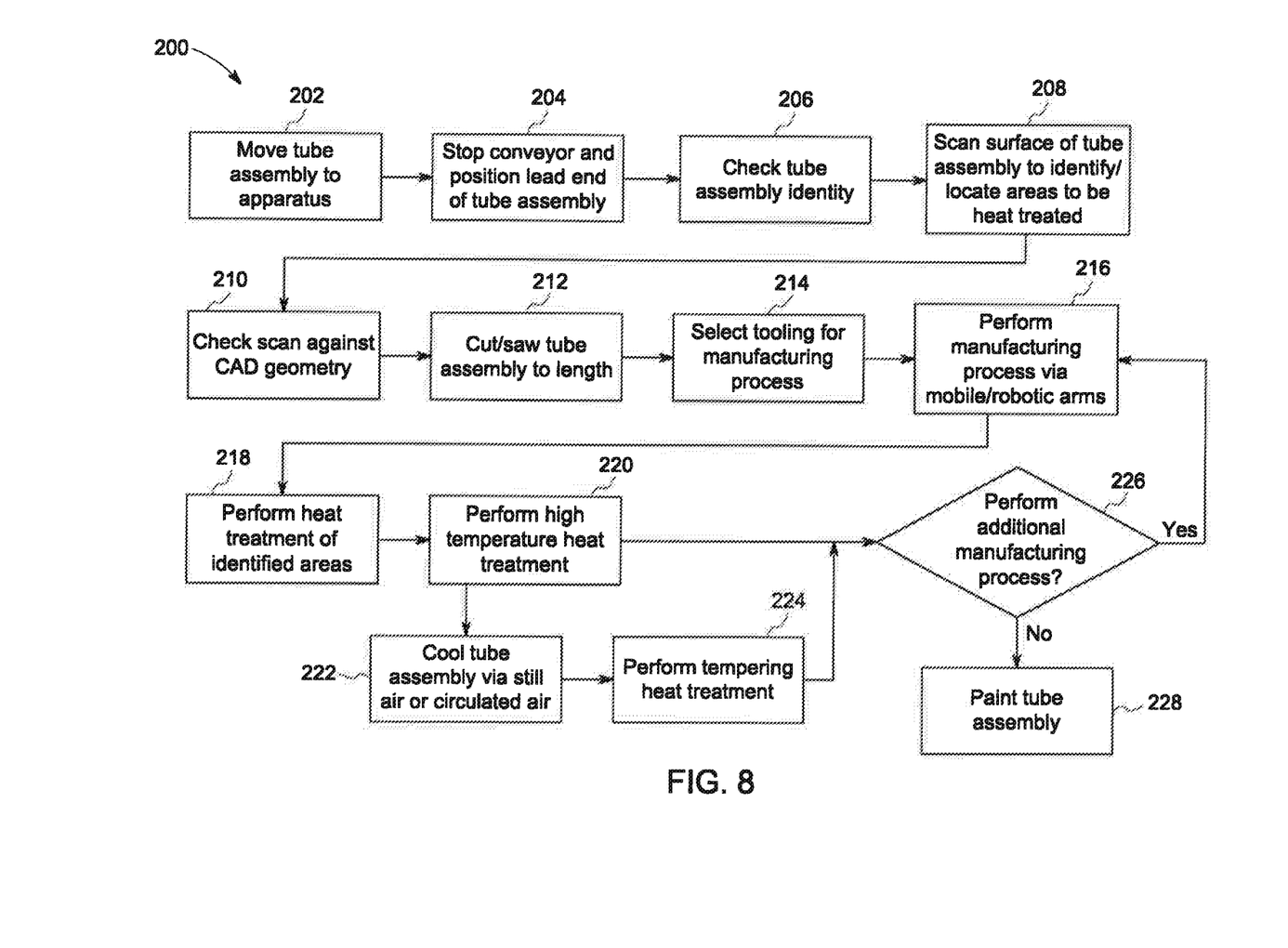
FIG. 8 is a flow chart depicting another method of manufacturing a part utilizing the system of FIG. 1, in accordance with an embodiment of the present invention.

Illustrated in FIG. 8 is another method 200 of manufacturing a part 12 utilizing the system 10 (FIGS. 1 and 2), in accordance with an embodiment of the present invention. The method 200 includes moving 202 a tube assembly 12 to the system 10 and stopping 204 the conveyor 26 to position a lead end of the tube assembly 12 onto the conveyor 26. Stopping 204 the conveyor 26 may be facilitated by a visual proximity sensor and/or a proximity switch.

The method 200 may also include a part number/identifier check 206 of the tube assembly 12 via a sensor or by manual inspection via an operator. The method 200 further includes scanning 208 the tube assembly 12 to identify areas 38 and 40 requiring heat treatment. The method 200 further includes checking 210 the scan data against a CAD drawing. In embodiments, the method 200 further includes cutting/sawing 212 the tube assembly 12 to a desired length. The method 200 may further include selecting 214 a tool 70 for the mobile arms 22 and/or 24 and performing 216 a manufacturing process on the identified areas 38 and 40 via the mobile arms 22 and 24. The method 200 may further include heat treating 218 the identified areas 38 and/or 40 and then performing 220 a high temperature heat treatment of the same areas 38 and/or 40. The method 200 may then include cooling 222 the areas 38 and/or 40 with still or circulated air, and then tempering 224 the areas 38 and/or 40. In embodiments, the method 200 may include determining 226 if another manufacturing process 216 is to be performed on the part 12 and if not, painting 228 (or another process apart from the system 10) and/or storing the part 12.

Finally, it is to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein, e.g., mechanization or automation, and/or to achieve the results described herein, which may be executed in real-time. For example, as stated above, the system 10 may include at least one processor and system memory/data storage structures in the form of a controller that electrically communicates with one or more of the components of the system 10. Additionally, a software application that provides for control over one or more of the various components of the system 10 may be read into a main memory of the at least one processor from a computer-readable media.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for manufacturing a part is provided. The system includes a gantry, a first mobile arm and a second mobile arm, at least one conveyor and at least one sensor. The gantry has a first member and a second member disposed opposite the first member so as to define an opening. The first and the second mobile arms are disposed on the first and the second members, respectively. The at least one conveyor is operative to move the part through the opening so as to position the part within access of the first and the second mobile arms. The at least one sensor is operative to guide the first and the second mobile arms to one or more areas of the part. The first and the second mobile arms are operative to perform a manufacturing process on the part at the one or more areas. In certain embodiments, the first and the second mobile arms are collectively operative to have 360° access to the part. In certain embodiments, the first and the second mobile arms are operative to respectively access a top side of the part and a bottom side of the part disposed opposite the top side. In certain embodiments, the at least one conveyor is operative to contact the bottom side of the part. In certain embodiments, the manufacturing process is heat treatment, tempering, solution annealing, and/or inspecting. In certain embodiments, the first and/or the second mobile arm includes a tool for accomplishing the manufacturing process. In certain embodiments, the tool is an inductive heater, a welding torch, and/or an optical pyrometer. In certain embodiments, the tool is the inductive heater and the inductive heater is shaped. In certain embodiments, the first and/or the second mobile arm is operative to automatically swap the tool for another tool. In certain embodiments, the part is a pressure part assembly for a boiler.

Yet another embodiment provides for a method for manufacturing a part. The method includes receiving the part at one or more conveyors operative to move the part through an opening of a gantry, the opening defined by a first member of the gantry and a second member of the gantry disposed opposite the first member. The method further includes positioning the part, via the one or more conveyors, within access of a first mobile arm of the gantry and a second mobile arm of the gantry. The first and the second mobile arms are disposed on the first and the second members, respectively. The method further includes guiding, via at least one sensor, the first and the second mobile arms to one or more areas of the part. The method further includes performing, via the first and the second mobile arms, a manufacturing process on the part at the one or more areas. In certain embodiments, the first and the second mobile arms are collectively operative to have 360° access to the part. In certain embodiments, performing, via the first and the second mobile arms, a manufacturing process on the part at the one or more areas includes accessing a top side of the part and a bottom side of the part via the first and the second mobile arms, respectively. The top side is opposite the bottom side. In certain embodiments, positioning the part, via the one or more conveyors, includes contacting the bottom side of the part with the one or more conveyors. In certain embodiments, the manufacturing process is heat treatment, tempering, solution annealing, and/or inspecting. In certain embodiments, the first and/or the second mobile arm includes a tool for accomplishing the manufacturing process. In certain embodiments, the tool is an inductive heater, a welding torch and/or an optical pyrometer. In certain embodiments, the tool is the inductive heater and the inductive heater is shaped. In certain embodiments, the method further includes automatically swapping the tool for another tool.

Still yet another embodiment provides for a non-transitory computer readable medium including instructions. The instructions adapt at least one processor to receive the part at one or more conveyors operative to move the part through an opening of a gantry. The opening is defined by a first member of the gantry and a second member of the gantry disposed opposite the first member. The instructions further adapt the at least one processor to position the part, via the one or more conveyors, within access of a first mobile arm of the gantry and a second mobile arm of the gantry. The first and the second mobile arms are disposed on the first and the second members, respectively. The instructions further adapt the at least one processor to guide, via at least one sensor, the first and the second mobile arms to one or more areas of the part. The instructions further adapt the at least one processor to perform, via the first and the second mobile arms, a manufacturing process on the part at the one or more areas.

Accordingly, by providing for automated localized post-weld heat treatment of a part, some embodiments of the present invention may reduce the risk of damaging sections of a part that do not benefit from heating. Further, but only heating localized regions/areas of a part, some embodiments of the present invention provide for greater efficiencies over a batch baking oven or an open continuous furnace. In other words, some embodiments of the present invention provide for a continuous work flow of the part without time being spent in a queued batch process while also greatly reducing the amount of heat/energy used to treat the part.

Further, some embodiments of the present invention may be mobile, e.g., the conveyors and gantry may be on wheels or other devices suitable for easy movement. As will be appreciated, such embodiments may provide for a workstation, i.e., the gantry and mobile arms, that can be easily inserted/integrated into various positions of an assembly line.

Further still, by providing for automated localized processing of a part, some embodiments of the present invention may provide for a reduction in processing time of a part over traditional manual approaches; and/or for a processing station, e.g., the gantry, within improved flexibility to receive and process, i.e., perform a manufacturing process on, parts having a wide range of shapes and sizes, as compared to traditional manufacturing lines which typically require parts to be of the same size and/or for the parts to be received in the same position from cycle to cycle.

Yet further still, by having mobile arms disposed on opposite sides of a gap within a conveyor flow path, i.e., the path from the upstream conveyor to the downstream conveyor, some embodiments of the present invention provide for localized 360° access to the part.

Yet further still, by providing for the ability to perform welding and post-weld heat treatment within the same device, some embodiments of the present invention reduce the amount of movement/handling of a part prior to post-weld heat treatment, which in turn reduces the risk of the part breaking and/or provides for greater manufacturing efficiencies.

Yet further still, by providing for 360° access via two mobile arms disposed on opposite sides of a part passing through the gantry/opening, some embodiments of the present provide for coordinated heat treatment of a portion of a tube, or other shaped part, i.e., along all sides of the tube. In other words, one mobile arm can heat treat a 180° portion of the circumference of a tube while another mobile arm can heat treat the remaining 180° portion of the circumference of the tube at the same time. Similarly, some embodiments may also provide for coordinated welding of a portion of a tube, or other part, which may mitigate and/or eliminate warping of the tube.

Further, by providing for the mobile arms to swap tools, some embodiments may improve the work flow of a manufacturing process. For example, in some embodiments, the mobile arms may first weld an area of an assembly, then switch to a heat treatment element. As will be appreciated, in such embodiments, the area may already be at or close to heat treatment temperature due to the heat generated during the welding process. Thus, by providing for the ability to quickly switch from welding torches to a heat treatment element, some embodiment may take advantage of the residual heat from the welding process to reduce the amount of time needed to complete heat treatment of the area.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

The invention claimed is:

1. A system for manufacturing a part, the system comprising:
 a gantry having a frame structure formed from a first horizontal member and a second horizontal member disposed opposite the first horizontal member, wherein the first horizontal member spans overhead of and spaced apart from the second horizontal member to define an opening therebetween, and a pair of vertical sidewall supporting members extending upward from a floor level to interconnect with the first horizontal member and the second horizontal member, wherein the first horizonal member and the second horizontal member are fixed in placed by the pair of vertical sidewall supporting members, and wherein the second horizontal member is elevated above the floor level;

a first mobile arm and a second mobile arm disposed on the first and the second horizontal members, respectively;

at least one conveyor operative to move the part through the opening so as to position the part over the second horizontal member within access of the first and the second mobile arms; and at least one sensor operative to guide the first and the second mobile arms to one or more areas of the part;

wherein the first and the second mobile arms are operative to perform a manufacturing process on the part at the one or more areas while passing over the second horizontal member, wherein the manufacturing process includes heat treatment, tempering, solution annealing, and/or inspecting.

2. The system of claim 1, wherein the first and the second mobile arms are collectively operative to have 360° access to the part.

3. The system of claim 1, wherein the first and the second mobile arms are operative to respectively access a top side of the part and a bottom side of the part disposed opposite the top side.

4. The system of claim 3, wherein the at least one conveyor is operative to contact the bottom side of the part.

5. The system of claim 1, wherein the first and/or the second mobile arm includes a tool for accomplishing the manufacturing process.

6. The system of claim 5, wherein the tool is an inductive heater, a welding torch, and/or an optical pyrometer.

7. The system of claim 6, wherein the tool is the inductive heater and the inductive heater is shaped.

8. The system of claim 5, wherein the first and/or the second mobile arm is operative to automatically swap the tool for another tool.

9. The system of claim 1, wherein the part is a pressure part assembly of a boiler.

10. A method for manufacturing a part, the method comprising:

receiving the part at one or more conveyors operative to move the part through an opening of a gantry, the gantry having a frame structure formed from a first horizontal member and a second horizontal member disposed opposite the first horizontal member, wherein the first horizontal member spans overhead of and spaced apart from the second horizontal member to define the opening, and a pair of vertical sidewall supporting members extending upward from a floor level to interconnect with the first horizontal member and the second horizontal member, wherein the first horizontal member and the second horizontal member are fixed in placed by the pair of vertical sidewall supporting members, and wherein the second horizontal member is elevated above the floor level;

positioning the part, via the one or more conveyors, over the second horizontal member within access of a first mobile arm of the gantry and a second mobile arm of the gantry, the first and the second mobile arms disposed on the first and the second members, respectively;

guiding, via at least one sensor, the first and the second mobile arms to one or more areas of the part; and performing, via the first and the second mobile arms, a manufacturing process on the part at the one or more areas while passing over the second horizontal member, wherein the manufacturing process includes heat treatment, tempering, solution annealing, and/or inspecting.

11. The method of claim 10, wherein the first and the second mobile arms are collectively operative to have 360° access to the part.

12. The method of claim 10, wherein performing, via the first and the second mobile arms, the manufacturing process on the part at the one or more areas comprises:

accessing a top side of the part and a bottom side of the part via the first and the second mobile arms, respectively, the top side opposite the bottom side.

13. The method of claim 12, wherein positioning the part, via the one or more conveyors, comprises:

contacting the bottom side of the part with the one or more conveyors.

14. The method of claim 10, wherein the first and/or the second mobile arm includes a tool for accomplishing the manufacturing process.

15. The method of claim 14, wherein the tool is an inductive heater, a welding torch and/or an optical pyrometer.

16. The method of claim 14, wherein the tool is the inductive heater and the inductive heater is shaped.

17. The method of claim 14, further comprising:

automatically swapping the tool for another tool.

18. A non-transitory computer readable medium comprising instructions that adapt at least one processor to:

receive a part at one or more conveyors operative to move the part through an opening of a gantry, the gantry having a frame structure formed from a first horizontal member and a second horizontal member disposed opposite the first horizontal member, wherein the first horizontal member spans overhead of and spaced apart from the second horizontal member to define the opening, and a pair of vertical sidewall supporting members extending upward from a floor level to interconnect with the first horizonal member and the second horizontal member, wherein the first horizontal member and the second horizontal member are fixed in placed by the pair of vertical sidewall supporting members, and wherein the second horizontal member is elevated above the floor level;

position the part, via the one or more conveyors, over the second horizontal member within access of a first mobile arm of the gantry and a second mobile arm of the gantry, the first and the second mobile arms disposed on the first and the second members, respectively;

guide, via at least one sensor, the first and the second mobile arms to one or more areas of the part; and perform, via the first and the second mobile arms, a manufacturing process on the part at the one or more areas while passing over the second horizontal member, wherein the manufacturing process includes heat treatment, tempering, solution annealing, and/or inspecting.

* * * * *